United States Patent [19]

Ballreich et al.

[11] Patent Number: 4,809,612
[45] Date of Patent: Mar. 7, 1989

[54] USE OF RADIATION-CROSSLINKED POLYETHYLENE

[75] Inventors: Kurt Ballreich, Nurnberg; Axel Homburg, Taunusstein; Horst Rammensee, Nurnberg; Hans Umbach, Furth, all of Fed. Rep. of Germany

[73] Assignee: Dynamit Nobel Aktiengesellschaft, Troisdorf, Fed. Rep. of Germany

[21] Appl. No.: 34,989

[22] Filed: Apr. 6, 1987

Related U.S. Application Data

[63] Continuation of Ser. No. 726,794, Apr. 24, 1985, abandoned, which is a continuation of Ser. No. 448,598, Dec. 10, 1982, abandoned.

[30] Foreign Application Priority Data

Dec. 11, 1981 [DE] Fed. Rep. of Germany ....... 3149145

[51] Int. Cl.[4] .............................................. F42B 5/30
[52] U.S. Cl. ...................................... 102/466; 102/444
[58] Field of Search ............... 102/444, 464, 465, 466, 102/467, 430, 513, 501

[56] References Cited

U.S. PATENT DOCUMENTS

| | | | |
|---|---|---|---|
| 3,889,463 | 6/1975 | San Miguel | 102/103 |
| 3,911,202 | 10/1975 | Stine et al. | 174/120 SR |
| 4,140,058 | 2/1979 | Ballreich et al. | 102/43 P |
| 4,191,158 | 3/1980 | Curran | 124/76 |
| 4,604,248 | 8/1986 | Dehm | 102/291 |
| 4,638,735 | 1/1987 | Lelu et al. | 102/290 |

OTHER PUBLICATIONS

"Irradiated Polyethylene", *Modern Plastics*, Apr. 1954.

*Primary Examiner*—Deborah L. Kyle
*Assistant Examiner*—Daniel Wasil
*Attorney, Agent, or Firm*—Antonelli, Terry & Wands

[57] ABSTRACT

Polyethylene crosslinked by high-energy radiation, preferably electron beams, is an effective material for the manufacture of ammunition elements, preferably cases for cartridges. The case is produced by irradiating a molded case component of polyethylene with high-energy radiation.

10 Claims, 1 Drawing Sheet

USE OF RADIATION-CROSSLINKED POLYETHYLENE

This is a continuation of application Ser. No. 726,794, filed Apr. 24, 1985 which is a continuation of application Ser. No. 448,598, filed Dec. 10, 1982, both abandoned.

This invention relates to the use of polyethylene, preferably crosslinked with electron beams, for the production of cartridges used in the manufacture of ammunition, preferably training cartridges.

Training cartridges (i.e., practice cartridges, dummy cartridges, etc.) having cases made of a synthetic resin, as described, for example, in German Pat. No. 1,016,102 and German Pat. No. 1,146,785, are primarily produced from polyethylene. The manufacture of such cartridge cases from polyethylene yields the advantage of high shock resistances in a temperature range from +70° to −20° C., in exceptional cases up to −40° C. However, when these polyethylene-containing cartridges are used in automatic firearms having a high firing velocity, the disadvantage occurs that the barrel and/or cartridge chamber heats up to above 130° C.; i.e., to a temperature at which polyethylene starts to melt.

If in such a firearm, heated to high temperatures, the firing sequence is interrupted, and an unfired cartridge remains in the cartridge chamber, then melted-off pieces of the case in the firearm causes contaminations which can lead to disturbance and/or damage and to failure of the firearm.

Efforts have been made for the past several years to avoid these drawbacks without relinquishing the existing advantages. It was thought to utilize synthetic resins having a higher thermal stability. However, far-ranging efforts showed that all of the synthetic resins, which appeared to be usable as cartridge materials, do not withstand the aforementioned temperatures; i.e., the materials melt or are decomposed at high temperature, or the materials do not exhibit the required shock resistance at temperatures of below 20° C. and especially below −20° C., so that either cracks form in the cartridge or the case bottom and/or the dummy projectile are blasted off.

Additional experiments made with polyethylene crosslinked by peroxides did result in improved temperature stability. However, this caused economical disadvantages due to a longer injection molding cycle, and above all, considerable technical difficulties when removing the cartridge cases from the mold and great nonuniformities of the injection molded components.

It has been found that the existing difficulties can be solved by the use of radiation-crosslinked polyethylene for cases intended for training cartridges.

Therefore, the invention concerns the use of polyethylene, crosslinked with high-energy radiation, preferably electron beams, for the manufacture of elements for cartridges, preferably training cartridges.

The term "elements" are understood to mean, in particular, the "case" and parts thereof used in the production of the cartridge of ammunition used in firearms, etc.

It was surprisingly found that, with the use of radiation-crosslinked polyethylene, there is no melting of the training cartridge cases in the hot cartridge chamber and that, furthermore, the shock resistance satisfies all posed requirements even at temperatures in the range of −20° C.

The advantage obtained is that the cases for the training cartridges can be manufactured as before from polyethylene by injection molding or the like, so that the manufacturing plants remain usable, and that the finished molded component; i.e., the case or like element, can subsequently be adequately crosslinked with high-energy radiation.

Highly suitable are electron beams accelerated at more than 1 million volts; i.e., 3 million volts to 10 million volts and generating a dosage rate of more than 1 Mrad per minute; i.e., 10 Mrad/min to 1000 Mrad/min; while other high-energy radiation like gamma and alpha radiation is possible, but not as well suited due to the low dosage rates and the thereby caused longer radiation time for the same degree of crosslinking. The crosslinking of especially training cartridge cases, especially with high-energy electron beams of a high dosage rate, yields the unexpected advantage that no damage occurs due to atmospheric oxygen, although atmospheric oxygen is not excluded during the radiation-crosslinking step.

One-piece cases with molded-on dummy projectiles, with a crimped or stamped or similar closure which, for example, burst open and releases gases (maneuver ammunition and/or blank cartridges) can be especially advantageously crosslinked with high-energy radiation.

The dummy projectile can, however, also be produced separately and, subsequently, be inserted in the polyethylene case, or it can be fashioned to be separable (training ammunition and/or optionally live ammunition).

In general, in case of the manufacture of training cartridges, a separately manufactured bottom piece with the primer element arranged therein is attached or inserted with the aid of a groove or a thread, and/or is retained by a shape-mating connection with the case.

A special advantage resides in that radiation-crosslinked training cartridge cases no longer melt at 130° C. The radiation-crosslinked cases become rubber-elastic to a certain extent.

The increase in heat distortion stability, thermal stability, modulus of elasticity above the crystalline melting point, as well as stress-crack resistance of the cartridge cases due to radiation-crosslinking, with sufficient cold impact strength, quite considerably improves the cartridge properties. Above all, the cartridge case of radiation-crosslinked polyethylene, which is substantially more dimensionally stable and more rigid at cartridge chamber temperatures above 130° C., can be flawlessly pulled out of the hot cartridge chamber without residues of the polyethylene sticking to parts of the firearm. It is thus possible, just as in case of training cartridges having cases of metal, to continue use of the firearm after firing with a loaded cartridge, so that the previous, thorough cleaning and any possible workshop operations, heretofore necessary with synthetic resin-containing training cartridges, are eliminated.

The crosslinking is not only effecting the outer exposed surface of the ammunition elements but practically throughout the entire polyethylene. The degree of crosslinking should be between 40 and 90%, preferably between 60 and 75%. The degree of crosslinking is measured, for example, by cutting the crosslinked polyethylene into small chips, filling a quantity of e.g. 0.5 g into a metallic case provided with holes and putting this case into a container filled with xylene. The sample is then boiled under normal pressure in the xylene for 14 h. The non-crosslinked parts are dissolved. The crosslinked matrix remains undissolved in the case and can be reweighed after drying. The degree of crosslinking is attained in % by dividing the originally weight-in quantity through the reweighed quantity of the dried matrix, multiplied by 100.

The polyethylene used should preferably have a molecular weight between 80,000 and 120,000. The distribution of the molecular weight should be as narrow as possible and the density should preferably be higher than 0.94 g/cm$^3$.

The invention is illustrated in the drawing and will be described below with reference thereto.

Figure 1:
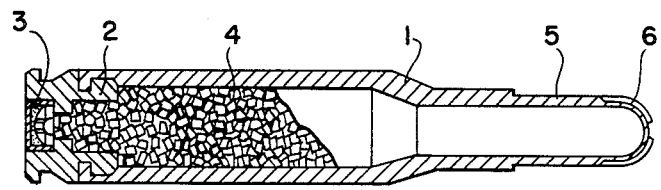
FIG. 1 shows a longitudinal section through a blank cartridge.

According to FIG. 1, the blank or maneuver cartridge has a case 1 of polyethylene crosslinked with high-energy radiation. In the rear end of the case 1 the metallic bottom piece 2 provided with the primer element 3 is inserted. The case 1 is further containing the propellant powder charge 4. At its forward end the case 1 is provided with the one-piece molded-on hollow dummy projectile 5 which shows preferential rupture liner 6 at its forward end. The dummy projectile will burst along these lines under the influence of the powder gases upon ignition without that pieces are torn off.

Figure 2:
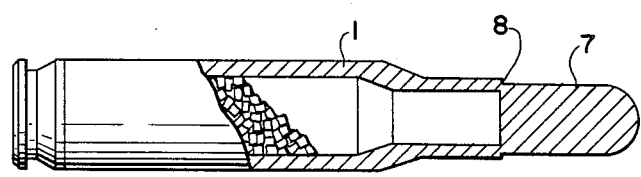
FIG. 2 shows, in a partial sectional view, a training cartridge.

The training cartridge in FIG. 2 differs from the cartridge shown in FIG. 1 only in so far as the case 1 is provided at its forward end with a massive dummy projectile 7 which is molded-on in one piece and will be separated along the weakened area 8 upon ignition and forced through the barrel of a not shown weapon as a light projectile especially for training purposes.

Figure 3:
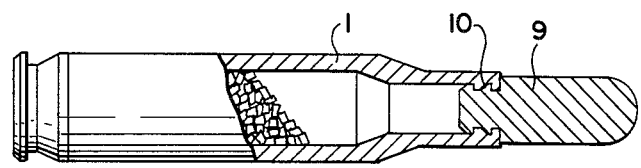
FIG. 3 shows a modification of FIG. 2.

The training cartridge of FIG. 3 differs from the one in FIG. 2 by the fact, that the dummy projectile 9 is produced separately and fastened in the case 1 by a snap connection 10.

The invention is further explained by the following two examples:

EXAMPLE 1

The cases for a cartridge of the calibre 7.62 mm are injection molded with a pressure of up to 2,000 bar and a temperature of the polyethylene of about 300° C., using a conventional screw extruder with a water-cooled multicavity mould.

These cases are then, according to the invention, cross-linked by irradiating with electron beams with a dose of 5 to 50 Mrad, preferably 8 to 12 Mrad. Thereafter the propellant powder is filled into the cases. After closing the rearward end of the cases by inserting and snapping in the bottom pieces with igniters the cartridges are ready for use. After firing these cartridges can be removed out of cartridge chambers with temperatures up to 240° C. without sticking.

EXAMPLE 2 (for comparison)

A cartridge with a case made of the same polyethylene as in Example 1 but non-crosslinked sticks already at chamber temperatures of 130° C., flows in undercuts of the cartridge chamber and can be removed out of this only very laboriously.

We claim:

1. A cartridge case of training ammunition useful in an automatic firearm having a cartridge case with walls heated during firing up to temperatures at which non-crosslinked polyethylene starts to melt and to which a non-crosslinked polyethylene-containing cartridge case sticks to cause contamination of the firearm, said cartridge case comprising a tubular component molded of polyethylene and, thereafter, exposed to energy radiation to crosslink the polyethylene from an outer exposed surface of the component practically throughout the entire component so that the cartridge case has the ability to be removed from a cartridge chamber of an automatic firearm heated to temperatures up to 250° C. without residues of the crosslinked polyethylene sticking to heated walls of the cartridge chamber.

2. A cartridge case according to claim 1, wherein the polyethylene of the tubular molded component is crosslinked with electron beams to exhibit a degree of crosslinking of between 40 and 90%.

3. A cartridge case according to claim 2, wherein the polyethylene of the tubular component has a molecular weight of between 80,000 and 120,000 and a density higher than 0.94 g/cm$^3$.

4. A cartridge case of ammunition useful in automatic firearm having a cartridge chamber with walls heated during firing up to temperatures at which non-crosslinked polyethylene starts to melt and to which a non-crosslinked polyethylene-containing cartridge case sticks to cause contamination of the firearm, said cartridge case comprising a tubular molded component formed of polyethylene having a molecular weight between 80,000 and 120,000 and a density higher than 0.94 g/cm$^3$ and, thereafter, exposed to energy radiation to crosslink the polyethylene from an outer exposed surface of the tubular component practically throughout the entire component so that the polyethylene of the tubular component is crosslinked to exhibit a degree of crosslinking of between 40 and 90% and so that the cartridge case has the ability to be removed from a cartridge chamber of an automatic firearm heated to temperatures up to 250° C. without residues of the crosslinked polyethylene sticking to heated walls of the cartridge chamber.

5. A cartridge of training ammunition useful in an automatic firearm having a cartridge chamber with walls heated during firing up to temperatures at which non-crosslinked polyethylene starts to melt and to which a non-crosslinked polyethylene-containing cartridge case sticks to cause contamination of the firearm, said cartridge comprising a radiation crosslinked polyethylene case and an associated dummy projectile, said case having been formed by injection molding of polyethylene into an appropriate configuration and the polyethylene of the injection molded case thereafter crosslinked by irradiating with energy radiation from an outer exposed surface of the case practically throughout the entire case so that the case of crosslinked polyethylene exhibits the ability to be removed from a cartridge chamber of an automatic firearm heated to temperatures up to 250° C. without residues of the crosslinked polyethylene sticking to heated walls of the cartridge chamber.

6. A cartridge according to claim 5, wherein the polyethylene of the injection molded case is crosslinked with electron beams.

7. A cartridge case of training ammunition useful in an automatic firearm having a cartridge chamber with walls heated up during firing to temperatures at which non-crosslinked polyethylene starts to melt and to which a non-crosslinked polyethylene-containing cartridge case sticks to cause contamination of the firearm, said training cartridge comprising a radiation crosslinked polyethylene case and associated dummy projectile, said case having been formed by injection molding of polyethylene having a molecular weight between 80,000 and 120,000 and a density higher than 0.94 g/cm$^3$ into an appropriate configuration and the polyethylene of the injection molded case thereafter having been crosslinked by energy radiation from an outer exposed surface of the case practically throughout the entire case, said radiation comprising electron beams accelerated at 3 to 10 million volts and at a dosage rate of 10 to 1,000 Mrad/minute, so that the crosslinked polyethylene cartridge case exhibits a degree of crosslinking of between 40 and 90% and so that the crosslinked polyethylene case exhibits the ability to be removed from a cartridge chamber of an automatic firearm heated to temperatures up to 250° C. without residues of the crosslinked polyethylene sticking to heated walls of the cartridge chamber.

8. A method for producing a case for a training ammunition cartridge to be used in an automatic firearm having a cartridge chamber with walls heated during firing up to temperatures at which non-crosslinked polyethylene starts to melt and to which a non-crosslinked polyethylene-containing cartridge case sticks to cause contamination of the firearm, said method comprising forming the cartridge case by molding polyethylene into an appropriate tubular configuration and, thereafter, exposing the polyethylene of the molded cartridge case to energy radiation to crosslink the polyethylene from an outer exposed surface of the case practically throughout the entire case so that the cartridge case exhibits the ability to be removed from a cartridge chamber of an automatic firearm heated to temperatures up to 250° C. without residues of the crosslinked polyethylene sticking to heated walls of the cartridge chamber.

9. A method according to claim 8, wherein the energy radiation consists of electron beams accelerated at 3 to 10 million volts and at a dosage rate of 10 to 1,000 Mrad/minute and wherein the polyethylene of the molded case is crosslinked to exhibit a degree of crosslinking of between 40 and 90%.

10. A cartridge case of training ammunition in a cartridge chamber of an automatic firearm, said cartridge chamber having walls that during the firing of the firearm heat up to temperatures at which non-crosslinked polyethylene starts to melt and to which a non-crosslinked polyethylene-containing cartridge case sticks to cause contamination of the firearm, said cartridge case comprising a tubular component molded of polyethylene and, thereafter, exposed to energy radiation to crosslink the polyethylene from an outer exposed surface of the component practically throughout the entire component so that the cartridge case has the ability to be removed from a cartridge chamber of an automatic firearm heated to temperatures up to 250° C. without residues of the crosslinked polyethylene sticking to heated walls of the cartridge chamber.

* * * * *